United States Patent
Bulusu et al.

(10) Patent No.: US 10,635,553 B2
(45) Date of Patent: Apr. 28, 2020

(54) ERROR RECOVERY IN NON-VOLATILE STORAGE PARTITIONS

(71) Applicant: Microsoft Technology Licensing, LLC, Redmond, WA (US)

(72) Inventors: Mallik Bulusu, Bellevue, WA (US); Tom L. Nguyen, Auburn, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 186 days.

(21) Appl. No.: 15/789,730

(22) Filed: Oct. 20, 2017

(65) Prior Publication Data
US 2019/0121710 A1 Apr. 25, 2019

(51) Int. Cl.
G06F 11/00 (2006.01)
G06F 11/20 (2006.01)
G06F 11/16 (2006.01)
G06F 11/14 (2006.01)

(52) U.S. Cl.
CPC ...... *G06F 11/2094* (2013.01); *G06F 11/1435* (2013.01); *G06F 11/1666* (2013.01); *G06F 2201/805* (2013.01); *G06F 2201/82* (2013.01)

(58) Field of Classification Search
CPC ............ G06F 11/2094; G06F 11/1435; G06F 11/1666; G06F 11/0727; G06F 11/073; G06F 11/1402; G06F 11/1448; G06F 11/1469; G06F 11/1612; G06F 11/2053; G06F 2201/805; G06F 2201/82
See application file for complete search history.

(56) References Cited

U.S. PATENT DOCUMENTS

| 2011/0119456 A1 | 5/2011 | Ipek et al. | |
| 2013/0067137 A1* | 3/2013 | Molloy | G06F 1/3275 711/103 |
| 2015/0262633 A1* | 9/2015 | Lee | G11C 7/1075 710/308 |
| 2017/0102873 A1* | 4/2017 | Hanson | G06F 3/061 |
| 2017/0153955 A1* | 6/2017 | Lee | G06F 11/2069 |
| 2017/0322611 A1* | 11/2017 | Brennan | G06F 1/30 |
| 2019/0042414 A1* | 2/2019 | Juenemann | G06F 12/0804 |

FOREIGN PATENT DOCUMENTS

| WO | 2009124320 A1 | 10/2009 |
| WO | 2016064772 A1 | 4/2016 |

OTHER PUBLICATIONS

"International Search Report and Written Opinion Issued in PCT Application No. PCT/US2018/055757", dated Feb. 5, 2019, 20 Pages.

* cited by examiner

*Primary Examiner* — Joseph D Manoskey
(74) *Attorney, Agent, or Firm* — Mannava & Kang, P.C.

(57) ABSTRACT

In some examples, error recovery in non-volatile storage partitions may include determining, upon completion of a save operation that includes saving of data to a primary location, that an error occurred with respect to the save operation. Based on a determination that the error occurred with respect to the save operation, a reserved location for saving the data may be identified. The data may be saved to the reserved location. Metadata to indicate usage of the reserved location as the primary location for the saved data may be updated.

19 Claims, 8 Drawing Sheets

DETERMINE, DURING START-UP OF A COMPUTER SYSTEM, WHETHER DATA THAT IS TO BE USED FOR A RESTORE OPERATION ASSOCIATED WITH THE COMPUTER SYSTEM IS SAVED AT A PRIMARY LOCATION OR AT A RESERVED LOCATION
702

BASED ON A DETERMINATION THAT THE DATA IS SAVED AT THE PRIMARY LOCATION, ACCESS THE DATA FROM THE PRIMARY LOCATION
704

BASED ON A DETERMINATION THAT THE DATA IS SAVED AT THE RESERVED LOCATION, ACCESS THE DATA FROM THE RESERVED LOCATION
706

IMPLEMENT THE RESTORE OPERATION BASED ON THE ACCESSED DATA
708

ERROR RECOVERY IN NON-VOLATILE STORAGE PARTITIONS

BACKGROUND

In a computer system, volatile memory is computer storage that maintains its data while the computer system is powered on. An example of a volatile memory includes random access memory (RAM) that is used for primary storage in a computer system. Compared to volatile memory, non-volatile memory may be used for secondary storage, or persistent storage. Examples of non-volatile memory include read-only memory, flash memory, magnetic computer storage devices, etc. Another example of non-volatile memory includes a non-volatile dual in-line memory module (NVDIMM), which is a type of random-access memory that retains its data even in the event of an unanticipated loss of power, a normal computer system shutdown, or an unanticipated computer system crash.

A type of an NVDIMM includes a non-volatile dual in-line memory module-software (NVDIMM-SW). NVDIMM-SW may represent a storage class memory device in a cloud hardware. NVDIMM-SW may provide for efficient write access to storage devices by pairing double data rate fourth-generation (DDR4) DIMMs with a non-volatile memory express (NVMe) storage partition (or a plurality of NVMe storage partitions) using firmware assistance. The NVMe partition may encounter errors and failures that may impact the ability to successfully save data. In the event of such errors and failures, it is technically challenging to save the data in a non-loss manner, resulting in the loss of valuable end-user data.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for error recovery in non-volatile storage partitions, methods for error recovery in non-volatile storage partitions, and non-transitory computer readable media having stored thereon machine readable instructions to provide error recovery in non-volatile storage partitions are disclosed herein. The apparatuses, methods, and non-transitory computer readable media disclosed herein provide for switching of storage blocks (e.g., storage partitions as disclosed herein) to reserved storage blocks on an on-demand basis when errors are encountered during a save operation. The reserved storage blocks may include over-provisioned storage blocks. Usage of the reserved storage blocks may be tracked by metadata added, for example, to a system management mode (SMM) region and/or a non-volatile memory express (NVMe) metadata region.

Non-volatile memory may include a non-volatile dual in-line memory module (NVDIMM) that is a type of random-access memory that may include a synchronous dynamic random-access memory (SDRAM) for volatile memory, a negative-AND (NAND) flash that serves as a non-volatile memory for data retention, and a NVDIMM controller for controlling data save and retrieval operations between the SDRAM and the NAND flash. For example, the NVDIMM controller may control a backup operation that includes transmission of data from the SDRAM to the NAND Flash, and a restore operation that includes retrieval of data from the NAND Flash to the SDRAM. The backup operation may be powered by a battery. During booting of a computer, the basic input output system (BIOS) may identify the NVDIMM, and perform the restore operation that includes retrieval of data from the NAND Flash to the SDRAM. The NVDIMM with the SDRAM and the NAND Flash may also be referred to as NVDIMM-N.

Compared to NVDIMM-N, non-volatile dual in-line memory module-software (NVDIMM-SW) may represent a storage class memory device in a cloud hardware. NVDIMM-SW may provide for efficient write access to storage devices by pairing double data rate fourth-generation (DDR4) DIMMs with an NVMe storage partition (or a plurality of NVMe storage partitions) using firmware assistance. For example, NVDIMM-SW may use NVMe partitions as non-volatile memory to save the NVDIMM-SW contents across cold resets or system shut downs. Further, the NVDIMM-SW may use the DIMMs as volatile memory.

Cold resets may represent resets during which non-volatile data is preserved and the memory context in volatile memory is lost, whereas warm resets may represent resets during which memory contents are preserved across reboots.

With respect to saving of the NVDIMM-SW contents, during runtime, committed data may be transmitted directly to a dynamic random-access memory (DRAM) of the DIMM. The DRAM may be battery-backed and battery support for the DRAM may be provided by a power supply unit (PSU).

With respect to errors and failures seen on the NVMe partitions set aside for NVDIMM-SW contents, such errors and failures may include, for example, peripheral component interconnect express (PCIe) uncorrectable errors, direct memory access (DMA) failures, and other such errors and failures. Further, NVMe storage reliability characteristics such as wear leveling may adversely impact the ability to successfully save data. When NVDIMM-SW content is in the process of being saved from memory into the NVMe partitions, the basic input/output system (BIOS) and/or unified extensible firmware interface (UEFI) may detect such errors during the attempted safe. In the event of failure in an NVMe partition, it is technically challenging to save the data in a non-loss manner. That is, in the event of failure in an NVMe partition, on shutdown flows, the memory context in the DIMM may be lost. Further, in the event of failure in an NVMe partition, on shutdown flows, a valid copy of the data is not preserved in the NVMe partition. Thus, during a subsequent system boot, the pre-boot UEFI may not recover the NVDIMM-SW data. This loss of NVDIMM-SW data may lead to loss of valuable end-user data.

In order to address at least the aforementioned technical challenges with respect to saving of data in a non-loss manner, for the apparatuses, methods, and non-transitory computer readable media disclosed herein, the NVMe storage partition may be over-provisioned. In this regard, the amount of over-provisioning of the NVMe storage partition may be one to one redundant. Alternatively, the amount of over-provisioning of the NVMe storage partition may be a subset of the overall NVMe partition size. In this regard, the NVMe partition size may be determined, for example, based on reliability characteristics of underlying storage (e.g., a PCIe device). Further, additional metadata may be defined to keep track of usage of the over-provisioned storage.

According to examples, for the apparatuses, methods, and non-transitory computer readable media disclosed herein, the storage partitions may be switched to the reserved (e.g., over-provisioned) storage partitions on a demand basis when errors are encountered during an actual save operation.

According to examples, for the apparatuses, methods, and non-transitory computer readable media disclosed herein, metadata may be added to the SMM region and/or the NVMe metadata region to track usage of the reserved (and over-provisioned) partitions.

According to examples, the apparatuses, methods, and non-transitory computer readable media disclosed herein may provide for provisioning of reserved partitions for auto-recovery and/or migration of NVDIMM-SW data between the primary and reserved partitions.

According to examples, the apparatuses, methods, and non-transitory computer readable media disclosed herein may provide for tracking of the usage of reserved partitions using data structures that may be stored in system management (SMRAM) to help a save routine determine auto-recovery actions with respect to system re-boot.

According to examples, the apparatuses, methods, and non-transitory computer readable media disclosed herein may provide at least for modification to the operation of a computer system with respect to storage of NVDIMM-SW content in an NVMe partition. In this regard, the apparatuses, methods, and non-transitory computer readable media disclosed herein provide at least for modification to the operation of a computer system with respect to preservation of data that is to be stored in the NVMe partition, and usage of the preserved data during computer system re-boot, and for other types of recovery operations.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor-executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

Figure 1:
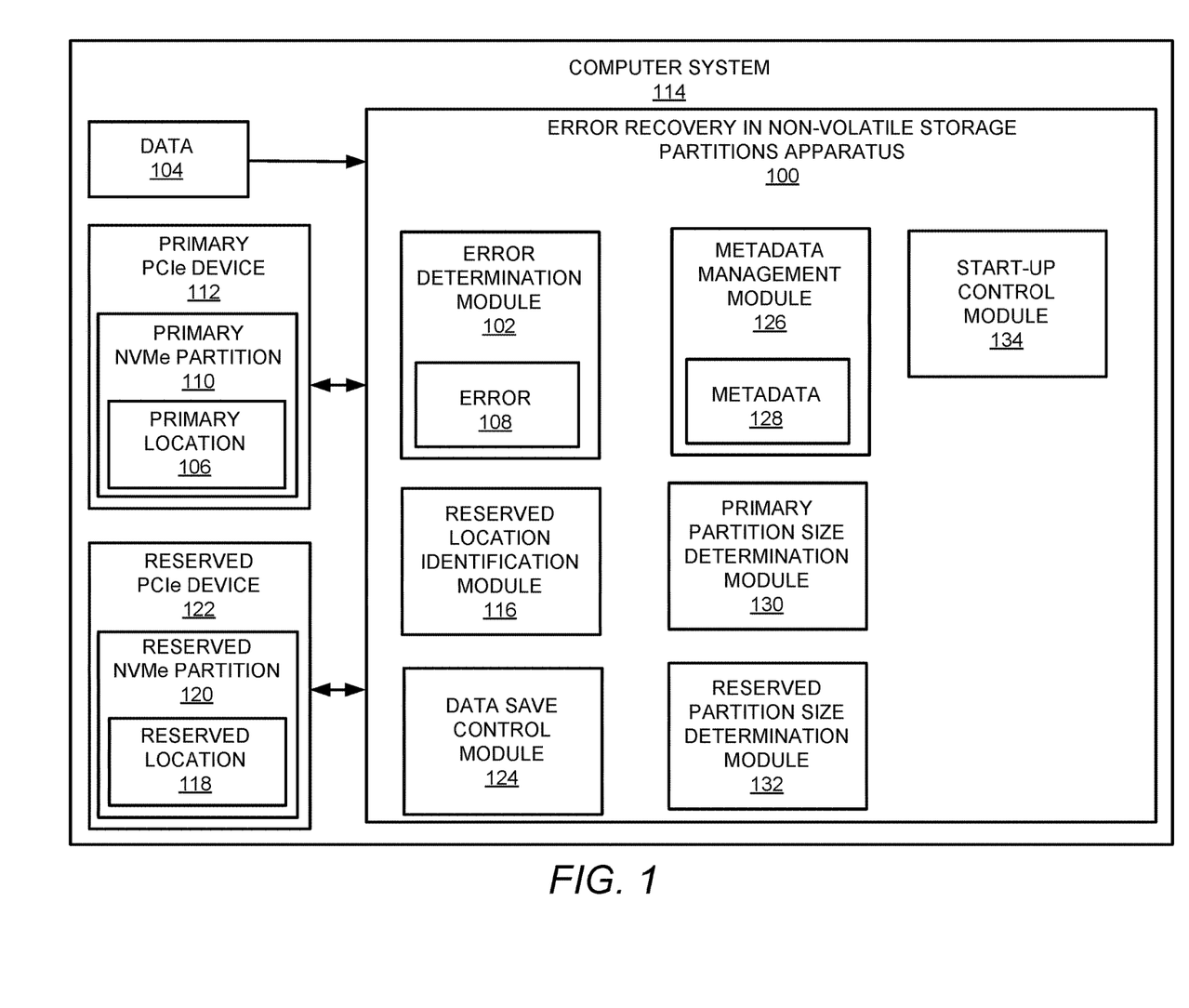
FIG. 1 illustrates a layout of an error recovery in non-volatile storage partitions apparatus in accordance with an embodiment of the present disclosure.

FIG. 1 illustrates a layout of an apparatus for error recovery in non-volatile storage partitions (hereinafter also referred to as "apparatus 100") according to an embodiment of the present disclosure.

Referring to FIG. 1, the apparatus 100 may include an error determination module 102 to determine, upon completion of a save operation that includes saving of data 104 to a primary location 106, that an error 108 occurred with respect to the save operation. According to examples, the data 104 may include NVDIMM-SW content. In addition, or in other examples, the primary location 106 may be associated with a primary NVMe partition 110 that is to be used to save the NVDIMM-SW content. In addition, or in other examples, the primary NVMe partition 110 may be implemented in a primary PCIe device 112.

According to examples, the error determination module 102 may determine, upon completion of the save operation that includes saving of the data 104 to the primary location 106, that the error 108 occurred with respect to the save operation by detecting a system shutdown associated with a computer system 114 that includes the save operation. In this regard, the error determination module 102 may determine, as part of the system shutdown associated with the computer system 114 that includes the save operation and upon completion of the save operation that includes the saving of the data 104 to the primary location 106, that the error 108 occurred with respect to the save operation.

According to examples, the apparatus 100 may be implemented on the computer system 114 as shown in FIG. 1. Alternatively, the apparatus 100 may be implemented separately from the computer system 114 (e.g., on another computer system, in a cloud environment, etc.). Further, various components of the apparatus 100 that provide the control for saving data from memory to storage, and for handling different types of errors as disclosed herein may be implemented in the basic input output system (BIOS) of the computer system 114.

According to examples, the error 108 may include a peripheral component interconnect (PCI) error on a bus connected to the primary PCIe device 112 that includes the primary NVMe partition 110. In addition, or in other examples, the error 108 may include a PCI error on a root port to which the primary PCIe device 112 that includes the primary NVMe partition 110 is connected. In addition, or in other examples, the error 108 may include a performance degradation of the primary PCIe device 112 that includes the primary NVMe partition 110. In addition, or in other examples, the error 108 may include an uncorrectable error associated with the primary PCIe device 112 that includes the primary NVMe partition 110.

Based on a determination that the error 108 occurred with respect to the save operation, a reserved location identification module 116 may identify a reserved location 118 for saving the data 104. According to examples, the reserved location identification module 116 may activate, based on the identification of the reserved location 118 for saving the data 104, the reserved location 118 for saving the data 104. In addition, or in other examples, the reserved location 118 may be associated with a reserved NVMe partition 120 that is to be used to save the NVDIMM-SW content based on the determination that the error 108 occurred with respect to the save operation. In addition, or in other examples, the reserved NVMe partition 120 may be implemented in a reserved PCIe device 122 that is different from the primary PCIe device 112.

A data save control module 124 may save the data 104 to the reserved location 118.

A metadata management module 126 may update metadata 128 to indicate usage of the reserved location 118 as the primary location 106 for the saved data 104. For example, the metadata management module 126 may update the metadata 128 to mark the primary location 106 as invalid for saving of further data. According to examples, the metadata management module 126 may store the updated metadata 128 in an NVMe metadata region of an NVDIMM as disclosed herein with reference to FIG. 2.

A primary partition size determination module 130 may determine a size of the primary NVMe partition 110 associated with the primary location 106. In this regard, a reserved partition size determination module 132 may specify a size of the reserved NVMe partition 120 associated with the reserved location 118 as being equal to the size of the primary NVMe partition 110. In addition, or in other examples, the reserved partition size determination module 132 may specify the size of the reserved NVMe partition 120 associated with the reserved location 118 as less than the size of the primary NVMe partition 110. In addition, or in other examples, the reserved partition size determination module 132 may specify the size of the reserved NVMe partition 120 associated with the reserved location 118 as being greater than the size of the primary NVMe partition 110.

According to examples, the reserved partition size determination module 132 may identify reliability characteristics of a storage medium that includes the primary NVMe partition 110. In this regard, the reserved partition size determination module 132 may specify a size of the reserved NVMe partition 120 based on the identified reliability characteristics of the storage medium that includes the primary NVMe partition 110. For example, the storage medium may include the primary PCIe device 112 as disclosed herein with reference to FIG. 2.

A start-up control module 134, may determine, during start-up of the computer system 114, whether data 104 that is to be used for a restore operation associated with the computer system 114 is saved at the primary location 106 or at the reserved location 118. In this regard, as disclosed herein, the reserved location 118 may be used upon the occurrence of an error 108 with respect to a save operation that includes saving of the data 104 to the primary location 106.

According to examples, the start-up control module 134 may analyze the metadata 128 associated with the save operation that includes the saving of the data 104 to the primary location 106 to determine, during the start-up of the computer system 114, whether the data 104 that is to be used for the restore operation associated with the computer system 114 is saved at the primary location 106 or at the reserved location 118.

According to examples, based on a determination that the data 104 is saved at the primary location 106, the start-up control module 134 may access the data 104 from the primary location 106. In addition, or in other examples, based on a determination that the data 104 is saved at the reserved location 118, the start-up control module 134 may access the data 104 from the reserved location 118.

Further to accessing of the data 104, the start-up control module 134 may implement the restore operation based on the accessed data 104.

Operation of the apparatus 100 is described in further detail with reference to FIGS. 1-5.

Figure 2:
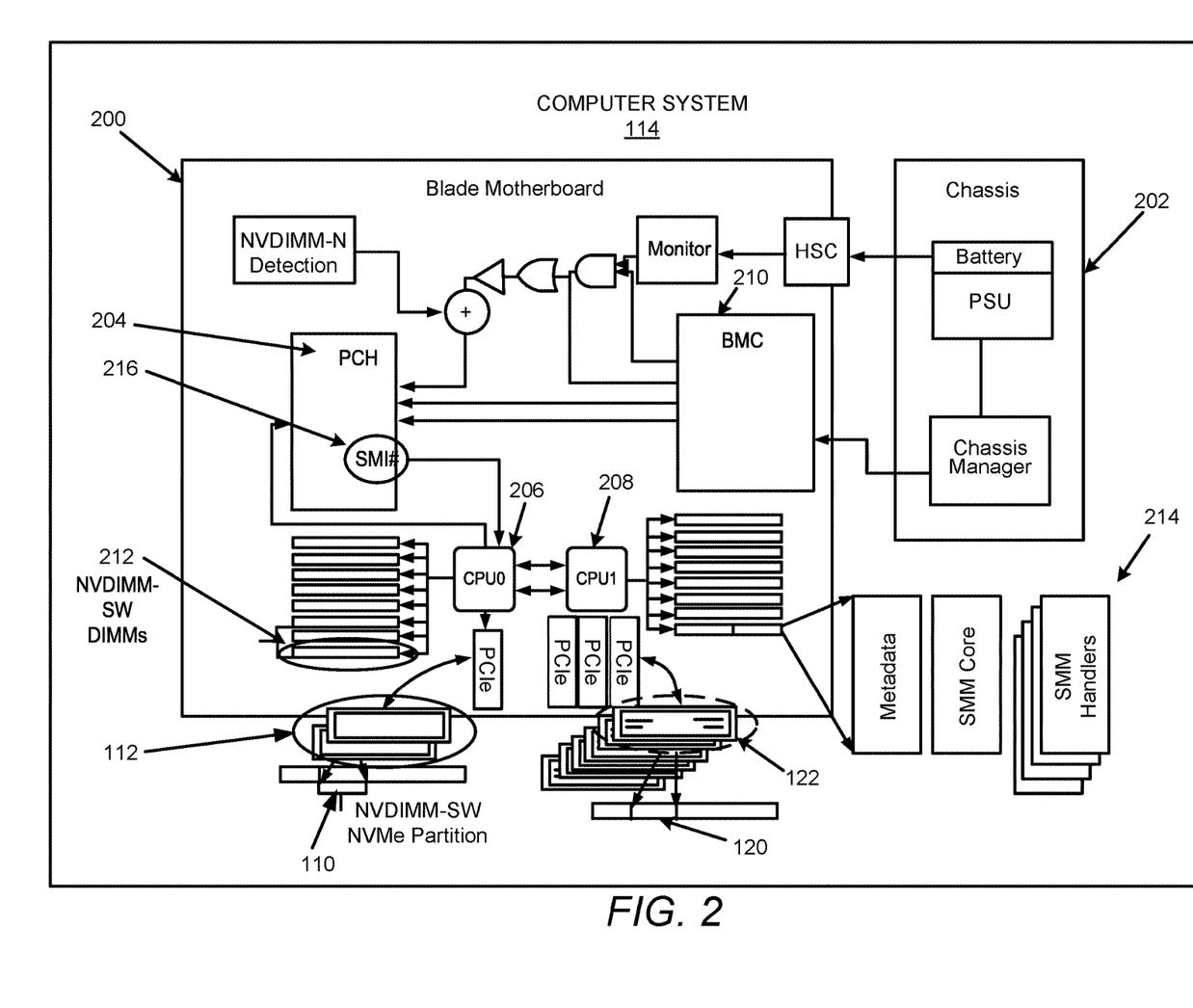
FIG. 2 illustrates an example of a layout including a double data rate fourth-generation (DDR4) non-volatile dual in-line memory module-software (NVDIMM-SW) with a non-volatile memory express (NVMe) additional partition for the error recovery in non-volatile storage partitions apparatus of FIG. 1 in accordance with an embodiment of the present disclosure.

FIG. 2 illustrates an example of a layout including a DDR4 NVDIMM-SW with an NVMe additional partition for the apparatus 100 in accordance with an embodiment of the present disclosure.

Referring to FIGS. 1 and 2, the computer system 114 may include various other components that are omitted for facilitating a description of the apparatus 100. In this regard, a motherboard 200 and a chassis 202 of the computer system 114 are illustrated in FIG. 2.

The motherboard 200 may include a platform controller hub (PCH) 204 to control certain data paths and support functions used in conjunction with central processing unit (CPUs). For example, the PCH 204 may support functions used in conjunction with CPU0 at 206 and CPU1 at 208.

For the example of FIG. 2, the primary PCIe device 112 and the reserved PCIe device 122 (including three reserved PCIe devices) may be operatively connected to one CPU or to multiple CPUs (e.g., as shown in FIG. 2). For example, the primary PCIe device 112 may be operatively connected to CPU0 and each reserved PCIe device 122 may be operatively connected to CPU1.

According to examples, the primary PCIe device 112 and the reserved PCIe device 122 may include 1 terabyte (TB) of storage capacity each. In this regard, according to examples, the primary NVMe partition 110 and the reserved NVMe partition 120 may include 16 gigabytes (GB) of storage capacity each, and an additional 1 GB for metadata. Alternatively, the primary NVMe partition 110 and the reserved NVMe partition 120 may include 64 GB of storage capacity each, and an additional 1 GB for metadata. According to examples, the sizes of the primary NVMe partition 110 and the reserved NVMe partition 120 may be allocated as needed or desired.

The baseboard management controller (BMC) at 210 may monitor the physical state of the computer system 114.

The NVDIMM-SW of FIG. 2 may include the DDR4 DIMMs at 212 (e.g., two DDR4 DIMMs are shown) for the volatile memory, with the DDR4 DIMMs at 212 being paired with the primary NVMe partition 110 for non-volatile memory operations.

The various components of the apparatus 100 that provide the control for saving data from memory (e.g., the DDR4 DIMMs at 212) to storage (e.g., the primary NVMe partition 110), and for handling different types of errors as disclosed herein may be implemented in the BIOS of the computer system 114. The BIOS for the computer system 114 may be implemented in the SMM at 214, which may be triggered through a system management interrupt (SMI) at 216.

The SMM at 214 may include the metadata 128, the SMM core, and SMM handlers. The SMM metadata 128 may include the information on which reserved NVMe partition 120 is being used for data storage. In addition, the SMM core may control the different SMM handlers with respect to saving of data, and analysis of different errors (e.g., the types of the error 108). For example, each error type may correspond to a different SMM handler with respect to saving of data.

Figure 3:
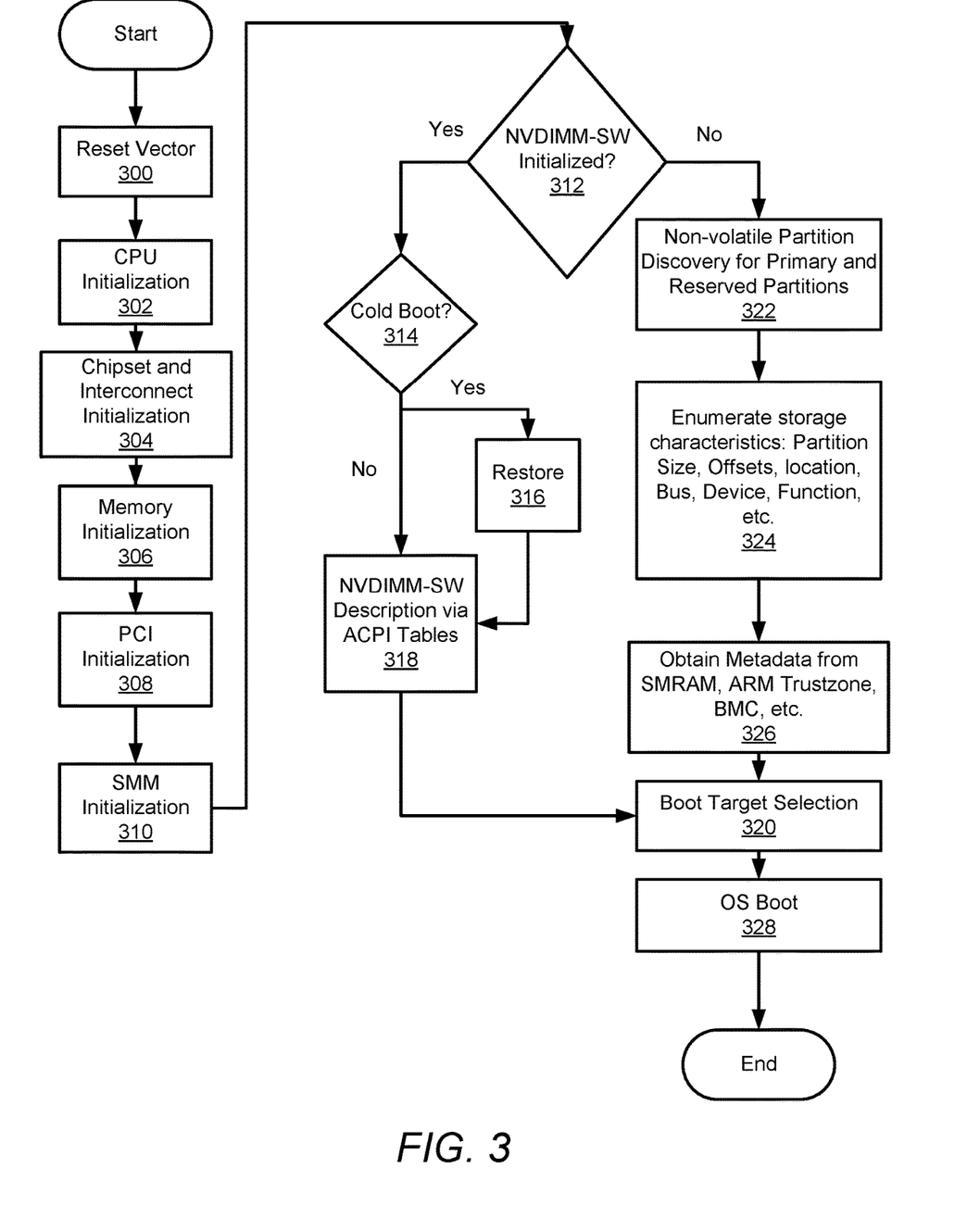
FIG. 3 illustrates an example flowchart of NVDIMM-SW initialization and restoration during a computer system boot for the error recovery in non-volatile storage partitions apparatus of FIG. 1 in accordance with an embodiment of the present disclosure.

FIG. 3 illustrates an example flowchart of NVDIMM-SW initialization and restoration during a computer system boot for the apparatus 100 in accordance with an embodiment of the present disclosure. Some or all of the operations disclosed herein with respect to NVDIMM-SW initialization and restoration may be controlled by the start-up control module 134 and/or other components of the apparatus 100.

Referring to FIG. 3, NVDIMM-SW initialization and restoration during system boot for the computer system 114 may commence at block 300 at a reset vector. The reset vector may represent a default location for a CPU to find the first instruction that is to be executed after a reset. In this regard, the reset vector may represent a pointer or address where the CPU should begin as soon as it is able to execute instructions. The address may be located in a section of NVM that is initialized to contain instructions to start the operation of the CPU as the first step in the process of booting the computer system 114.

At block 302, the NVDIMM-SW initialization and restoration during system boot for the computer system 114 may include CPU initialization. For the example of FIG. 2, the CPU initialization may include initialization of CPU0 and CPU1.

At block 304, the NVDIMM-SW initialization and restoration during system boot for the computer system 114 may include chipset and interconnect initialization.

At block 306, the NVDIMM-SW initialization and restoration during system boot may include memory initialization. For the example of FIG. 2, each of the DIMMs including the DIMMs at 212 may be initialized.

At block 308, the NVDIMM-SW initialization and restoration during system boot for the computer system 114 may include peripheral component interconnect (PCI) initialization. For example, the PCI initialization may include initialization of the primary PCIe device 112, and the reserved PCIe device 122.

At block 310, the NVDIMM-SW initialization and restoration during system boot for the computer system 114 may include SMM initialization. For the example of FIG. 2, SMM initialization may include initialization of the SMM at 214.

At block 312, a determination is made as to whether the NVDIMM-SW is initialized. For example, at block 312, a determination is made as to whether the NVDIMM-SW as disclosed herein with reference to FIG. 2 is initialized. Based on a determination at block 312 that the NVDIMM-SW is initialized, at block 314, a determination may be made as to whether a cold reset (e.g., cold boot) has been initiated. As disclosed herein, cold resets may represent resets during which non-volatile data is preserved and the memory context in volatile memory is lost, whereas warm resets may represent resets during which memory contents are preserved across reboots.

Based on a determination at block 314 that a cold reset has been initiated, at block 316, a restoration process may be commenced for the NVDIMM-SW. The restoration process may include obtaining data from the primary NVMe partition 110 (or the reserved NVMe partition 120), and transferring the data to the DIMMs (e.g., the DIMMs 212 of FIG. 2).

Alternatively, based on a determination at block 314 that a cold reset has not been initiated (e.g., the reset is a warm reset), at block 318, NVDIMM-SW description may be obtained via advanced configuration and power interface (ACPI) tables. The ACPI tables may provide the specifications for implementation of the NVDIMM-SW, for example, by identifying specific drivers that may be loaded and used to communicate with different components of the computer system 114.

Further to block 318, processing may proceed to block 320 for boot target selection to boot the computer system 114 to an operating system (OS).

Based on a determination at block 312 that the NVDIMM-SW is not initialized, at block 322, NVDIMM-SW initialization may be commenced. In this regard, non-volatile partition discovery for the primary NVMe partition 110 and the reserved NVMe partition 120 may be commenced.

At block 324, storage characteristics such as partition size for the primary NVMe partition 110 and the reserved NVMe partition 120, offsets, location including the primary location 106 and the reserved location, bus attributes, device specifics (e.g., the primary PCIe device 112 and the reserved PCIe device 122), function for a PCIe device (e.g., for a PCIe device that includes multiple functions), etc., may be enumerated.

At block 326, the metadata 128 may be obtained from the system management RAM (SMRAM), the ARM trustzone, the BMC, etc. For example, referring to FIG. 2, the metadata 128 may be stored in the SMM at 214, at the BMC at 210, etc.

At block 320, as discussed above, boot target selection may be commenced to boot the computer system 114 to an OS.

At block 328, OS boot may be commenced to end the NVDIMM-SW initialization and restoration during system boot for the computer system 114.

Figure 4:
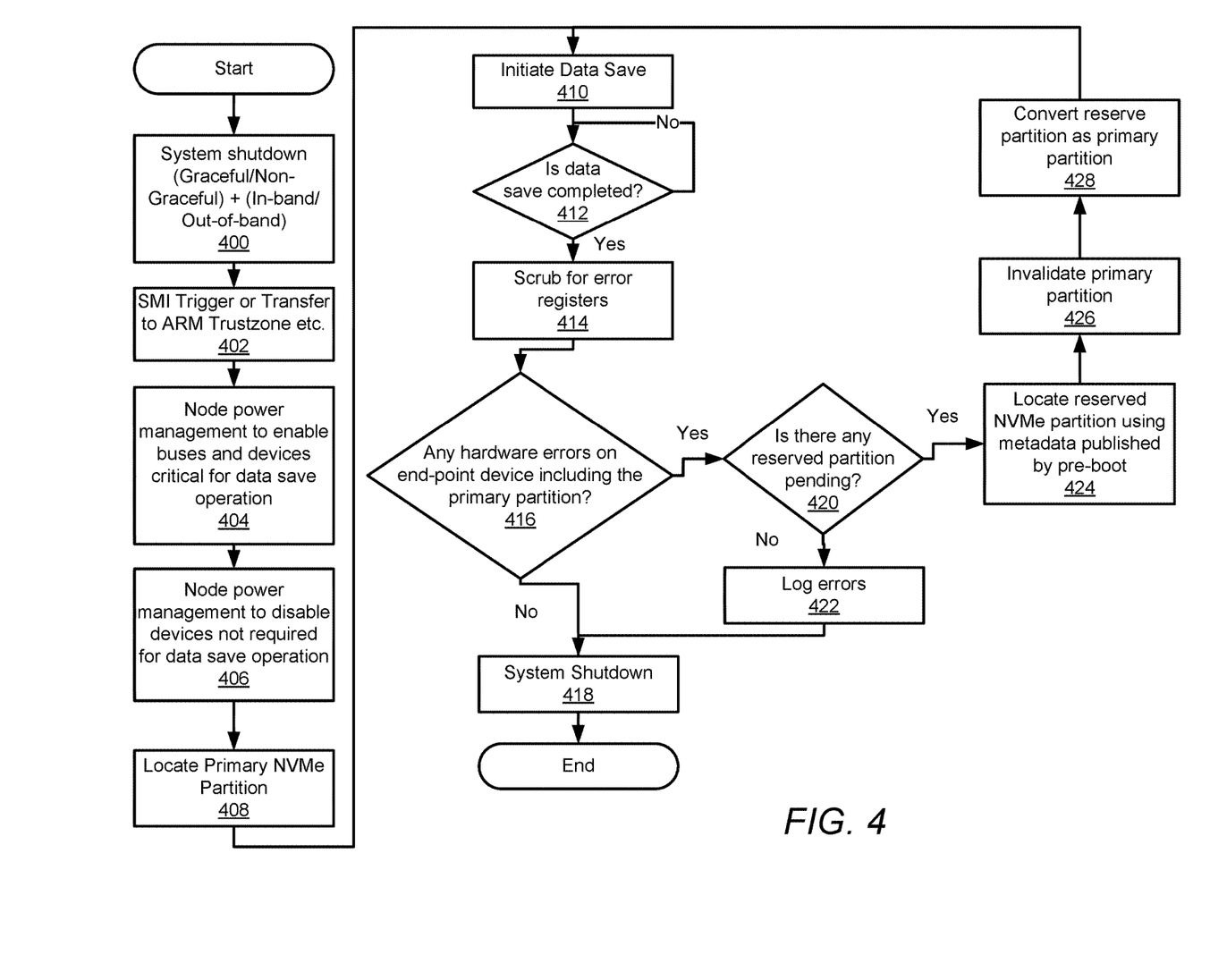
FIG. 4 illustrates an example flowchart of an NVDIMM-SW save during a computer system shutdown for the error recovery in non-volatile storage partitions apparatus of FIG. 1 in accordance with an embodiment of the present disclosure.

FIG. 4 illustrates an example flowchart of an NVDIMM-SW save during a computer system shutdown for the apparatus 100 in accordance with an embodiment of the present disclosure. Some or all of the operations disclosed herein with respect to NVDIMM-SW save during a computer system shutdown may be controlled by the data save control module 124 and/or other components of the apparatus 100.

Referring to FIG. 4, NVDIMM-SW save during system shutdown for the computer system 114 may commence at block 400 with a determination of a type of system shutdown for the computer system 114. For example, the evaluation at block 400 may include a determination of a graceful or non-graceful system shutdown, and whether the system shutdown is in-band or out-of-band. Graceful system shutdown may include a shutdown based on execution of a shutdown command, whereas a non-graceful shutdown may include a shutdown due to an error (e.g., a hardware error)

during operation of a computer system. An in-band system shutdown may include a shutdown due to a memory error, a CPU error, etc., whereas an out-of-band shutdown may include a shutdown due to actions of a computer system user.

At block 402, NVDIMM-SW save during system shutdown may include SMI trigger (e.g., to implement data save from the DIMMs to the primary NVMe partition 110), or transfer to ARM trustzone, etc.

At block 404, NVDIMM-SW save during system shutdown may include node power management to enable buses and devices (e.g., the primary PCIe device 112 and the reserved PCIe device 122) needed for the data save operation from the DIMMs to the primary NVMe partition 110.

At block 406, NVDIMM-SW save during system shutdown may include node power management to disable devices not required for the data save operation (e.g., a PCIe device that does not include a partition).

At block 408, the primary NVMe partition 110 in the primary PCIe device 112 may be located.

At block 410, the data save operation may be initiated (e.g., by the data save control module 124).

At block 412, the data save control module 124 may determine whether the data save is completed. Based on a determination that the data save is not complete, the data save control module 124 may repeat block 412 until the data save control module 124 determines that the data save is completed. Based on a determination at block 412 that the data save is completed, at block 414, the error determination module 102 may determine whether an error 108 occurred, for example, by scrubbing for error registers.

At block 416, the error determination module 102 may determine whether there are any hardware errors on an end-point device (e.g., the primary PCIe device 112) including the primary NVMe partition 110. Based on a determination at block 416 that there are no hardware errors on the end-point device including the primary NVMe partition 110, at block 418, system shutdown may be completed for the computer system 114.

With respect to block 420, based on a determination at block 416 that there are hardware errors on the end-point device including the primary NVMe partition 110, a determination may be made as to whether any reserved NVMe partition 120 is pending. Based on a determination at block 420 that there is no reserved NVMe partition 120 pending, at block 422, the error determination module 102 may log errors. In addition, system shutdown may be completed for the computer system 114 as indicated at block 418 and the method may end.

Based on a determination at block 420 that there is a reserved NVMe partition 120 pending, at block 424, the data save control module 124 may locate the reserved NVMe partition 120 using the metadata 128 published by pre-boot.

At block 426, the metadata management module 126 may update the metadata 128 to mark the primary location 106 as invalid for saving of further data.

At block 428, the reserved NVMe partition 120 may be converted to the primary NVMe partition 110 for saving the data 104. In addition, blocks 410-428 may be repeated until the system shutdown condition at block 418 is reached.

Figure 5:
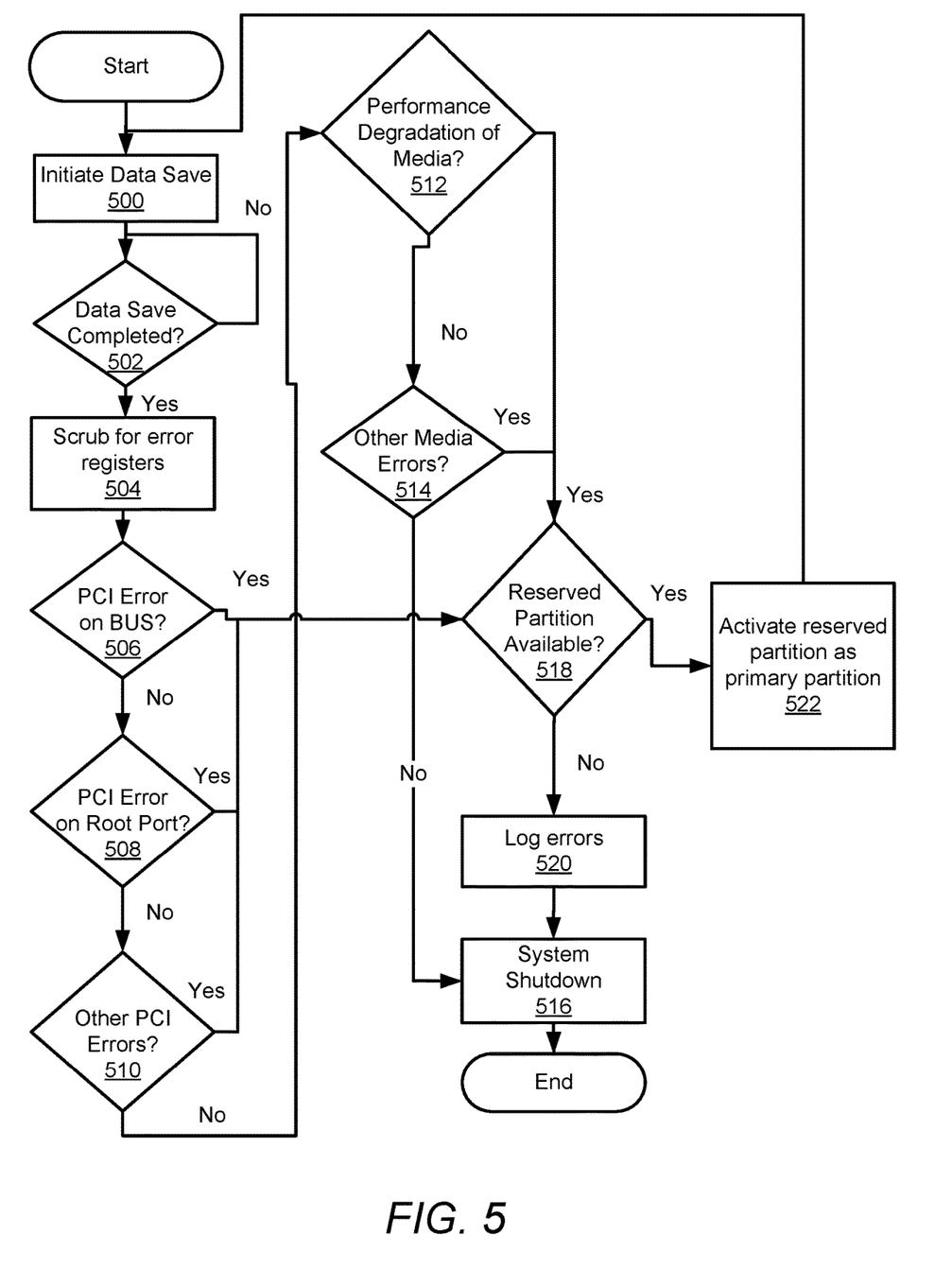
FIG. 5 illustrates an example flowchart of error detection affecting saving to a primary partition for the error recovery in non-volatile storage partitions apparatus of FIG. 1 in accordance with an embodiment of the present disclosure.

FIG. 5 illustrates an example flowchart of error detection affecting saving to a primary partition for the apparatus 100 in accordance with an embodiment of the present disclosure.

Referring to FIG. 5, error detection affecting saving to the primary NVMe partition 110 may commence at block 500 with initiation of a data save operation for the data 104. The data save control module 124 may control the data save operation.

At block 502, the data save control module 124 may determine whether data save for the data 104 is complete. Based on a determination at block 502 that the data save is complete, at block 504, the error determination module 102 is to scrub for error registers. Alternatively, in response to a determination at block 502 that data save is not complete, further processing may revert to block 502 until completion of the data save.

At block 506, the error determination module 102 may determine whether there is a PCI error on the bus. For example, the error 108 may include a PCI error on a bus connected to the primary PCIe device 112 that includes the primary NVMe partition 110. Based on a determination at block 506 that there is no PCI error on the bus, at block 508, the error determination module 102 may determine whether there is a PCI error on the root port. For example, the error 108 may include a PCI error on a root port to which the primary PCIe device 112 that includes the primary NVMe partition 110 is connected. For example, referring to FIG. 2, the primary PCIe device 112 may be at root port-0 and the reserved PCIe device 122 may be at root port-1. In this regard, the error 108 may include a PCI error on the root port-0 to which the primary PCIe device 112 that includes the primary NVMe partition 110 is connected.

Based on a determination at block 508 that there is no PCI error on the root port, at block 510, the error determination module 102 may determine whether there are any other PCI errors. An example of another PCI error may include a number of correctable error counts on the primary PCIe device 112 exceeding a platform limit.

Based on a determination at block 510 that there is no other PCI error, at block 512, the error determination module 102 is to determine whether there is performance degradation of media such as the primary PCIe device 112. For example, assuming that for the primary PCIe device 112 it takes one second to write one GB of data, after a certain number of writes, performance degradation due to wear leveling may result in a time of 1.2 seconds to write the one GB of data. In this regard, the performance degradation may exceed a specified threshold of 1.1 seconds per one GB of data.

Based on a determination at block 512 that there is no performance degradation of media such as the primary PCIe device 112, at block 514, the error determination module 102 may determine whether there are other media errors. An example of another media error may include a DMA failure on any logical partition during save execution.

Based on a determination at block 514 that there are no other media errors, at block 516, system shutdown for the computer system 114 may be completed.

Based on a determination at block 506 that there is a PCI error on the bus, or based on a determination at block 508 that there is a PCI error on the root port, or based on a determination at block 510 that there is another PCI error, or based on a determination at block 512 that there is performance degradation of media such as the primary PCIe device 112, or based on a determination at block 514 that there are other media errors, at block 518, the data save control module 124 may determine whether a reserved NVMe partition is available.

Based on a determination at block 518 that a reserved NVMe partition is not available, at block 520, the error determination module 102 may log errors. Further, at block 516, system shutdown of the computer system 114 may be completed.

Based on a determination at block 518 that a reserved NVMe partition 120 is available, at block 522, the reserved NVMe partition 120 may be activated as the primary NVMe partition 110.

Figure 6:
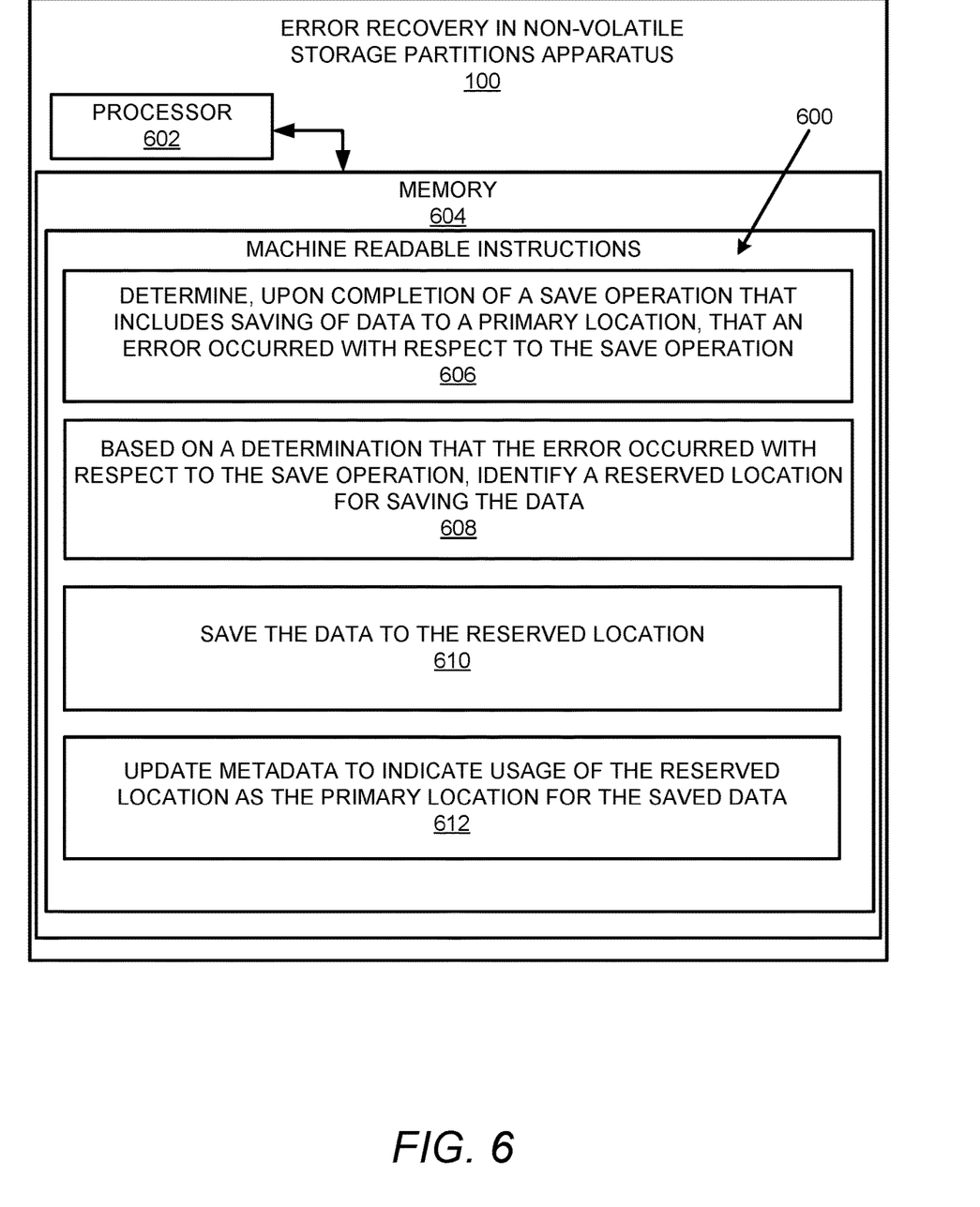
FIG. 6 illustrates a block diagram for error recovery in non-volatile storage partitions in accordance with an embodiment of the present disclosure.
Figure 7:
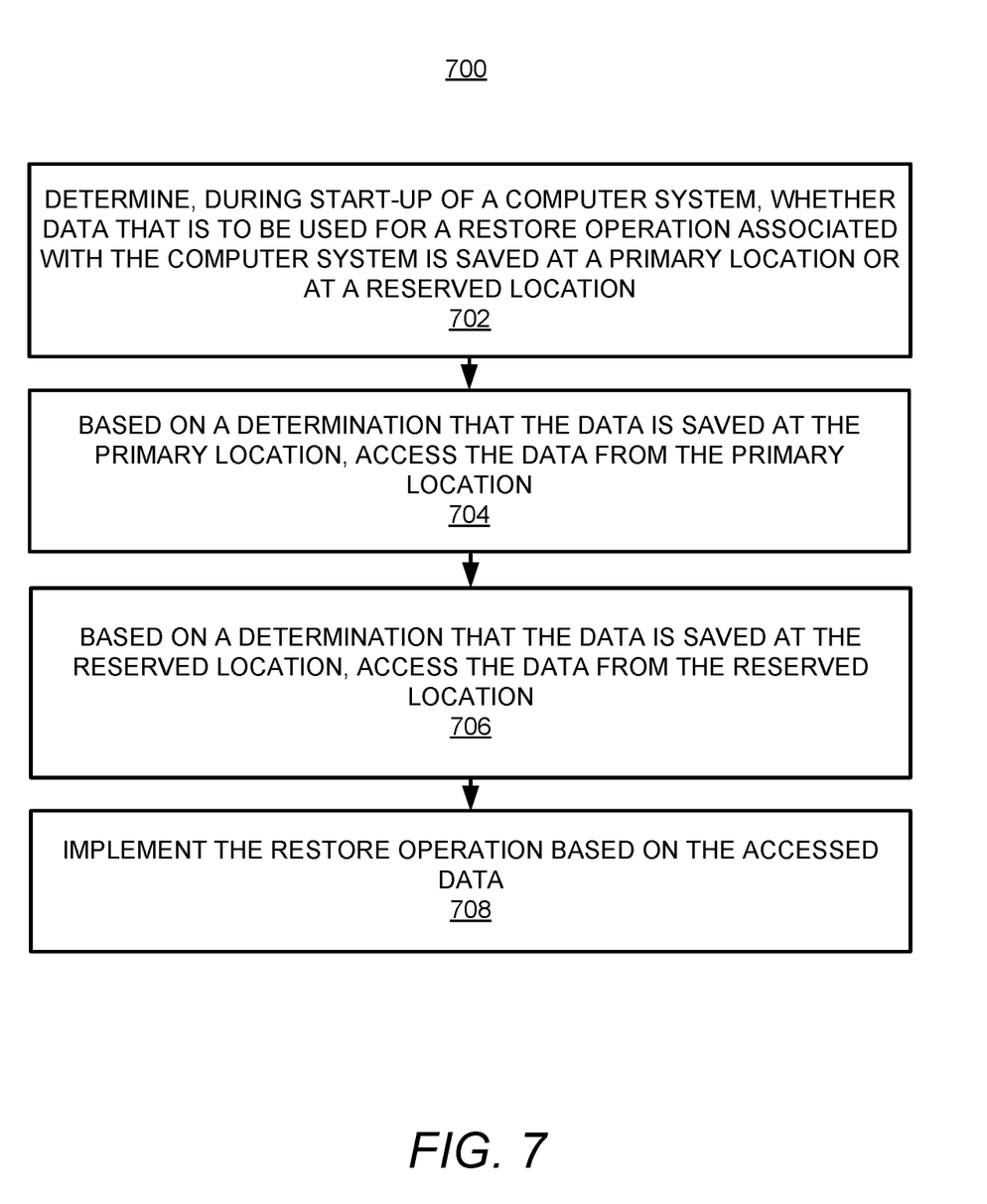
FIG. 7 illustrates a flowchart of a method for error recovery in non-volatile storage partitions in accordance with an embodiment of the present disclosure.
Figure 8:
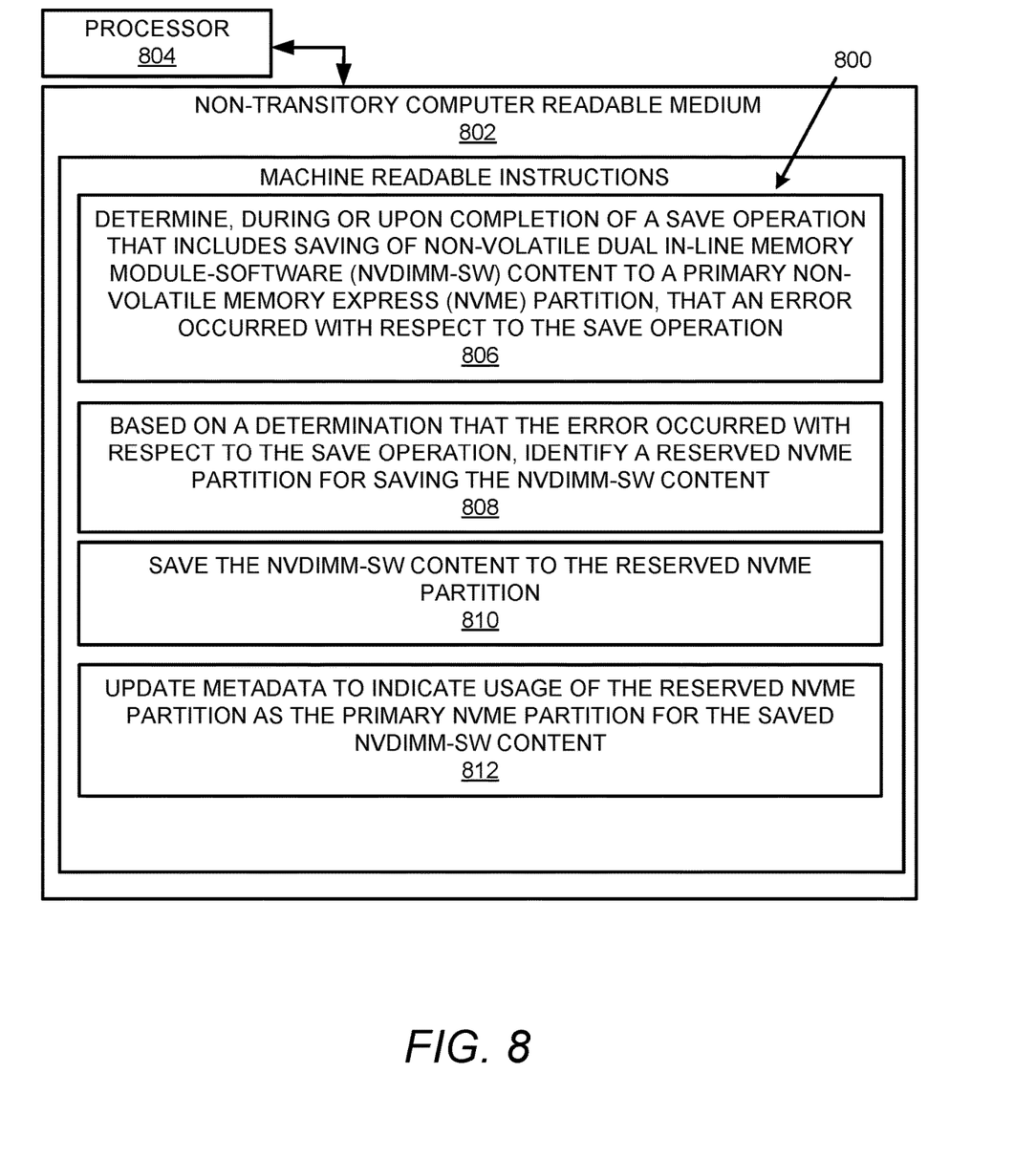
FIG. 8 illustrates a block diagram for error recovery in non-volatile storage partitions in accordance with another embodiment of the present disclosure.

FIGS. 6-8 respectively illustrate an example block diagram 600, a flowchart of an example method 700, and a further example block diagram 800 for error recovery in non-volatile storage partitions, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for error recovery in non-volatile storage partitions, and the steps of the method. FIG. 8 may represent a non-transitory computer readable medium 802 having stored thereon machine readable instructions to provide error recovery in non-volatile storage partitions according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to determine, upon completion of a save operation that includes saving of data 104 to a primary location 106, that an error 108 occurred with respect to the save operation.

Based on a determination that the error 108 occurred with respect to the save operation, the processor 602 may fetch, decode, and execute the instructions 608 to identify a reserved location 118 for saving the data 104.

The processor 602 may fetch, decode, and execute the instructions 610 to save the data 104 to the reserved location 118.

The processor 602 may fetch, decode, and execute the instructions 612 to update metadata 128 to indicate usage of the reserved location 118 as the primary location 106 for the saved data 104.

Referring to FIGS. 1-5 and 7, and particularly FIG. 7, for the method 700, at block 702, the method may include determining, during start-up of a computer system 114, whether data 104 that is to be used for a restore operation associated with the computer system 114 is saved at a primary location 106 or at a reserved location 118. The reserved location 118 may be used upon the occurrence of an error 108 with respect to a save operation that includes saving of the data 104 to the primary location 106.

At block 704, based on a determination that the data 104 is saved at the primary location 106, the method may include accessing the data 104 from the primary location 106.

At block 706, based on a determination that the data 104 is saved at the reserved location 118, the method may include accessing the data 104 from the reserved location 118.

At block 708, the method may include implementing the restore operation based on the accessed data 104.

Referring to FIGS. 1-5 and 8, and particularly FIG. 8, for the block diagram 800, the non-transitory computer readable medium 802 may include instructions 806 to determine, during or upon completion of a save operation that includes saving of NVDIMM-SW content to a primary NVMe partition 110, that an error 108 occurred with respect to the save operation.

Based on a determination that the error 108 occurred with respect to the save operation, the processor 804 may fetch, decode, and execute the instructions 808 to identify a reserved NVMe partition 120 for saving the NVDIMM-SW content.

The processor 804 may fetch, decode, and execute the instructions 810 to save the NVDIMM-SW content to the reserved NVMe partition 120.

The processor 804 may fetch, decode, and execute the instructions 812 to update the metadata 128 to indicate usage of the reserved NVMe partition 120 as the primary NVMe partition 110 for the saved NVDIMM-SW content.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
    a processor; and
    a memory storing machine readable instructions that when executed by the processor cause the processor to:
        detect a system shutdown associated with a computer system that includes a save operation to save data to a primary location;
        determine, as part of the system shutdown, upon completion of the save operation to save the data to the primary location, that an error occurred with respect to the save operation;
        based on a determination that the error occurred with respect to the save operation, identify a reserved location for saving the data;
        save the data to the reserved location; and
        update metadata to indicate usage of the reserved location as the primary location for the saved data.

2. The apparatus according to claim 1, wherein
    the data includes non-volatile dual in-line memory module-software (NVDIMM-SW) content,
    the primary location is associated with a primary non-volatile memory express (NVMe) partition that is to be used to save the NVDIMM-SW content, and the reserved location is associated with a reserved NVMe partition that is to be used to save the NVDIMM-SW content based on the determination that the error occurred with respect to the save operation.

3. The apparatus according to claim 2, wherein the instructions are further to cause the processor to:
   implement the primary NVMe partition in a primary peripheral component interconnect express (PCIe) device; and
   implement the reserved NVMe partition in a reserved PCIe device that is different from the primary PCIe device.

4. The apparatus according to claim 1, wherein the instructions are further to cause the processor to:
   update the metadata to mark the primary location as invalid for saving of further data.

5. The apparatus according to claim 1, wherein the instructions are further to cause the processor to:
   activate, based on the identification of the reserved location for saving the data, the reserved location for saving the data.

6. The apparatus according to claim 1, wherein the instructions are further to cause the processor to:
   determine a size of a primary partition associated with the primary location; and
   specify a size of a reserved partition associated with the reserved location as equal to the size of the primary partition.

7. The apparatus according to claim 1, wherein the instructions are further to cause the processor to:
   determine a size of a primary partition associated with the primary location; and
   specify a size of a reserved partition associated with the reserved location as less than the size of the primary partition.

8. The apparatus according to claim 1, wherein the instructions are further to cause the processor to:
   determine a size of a primary partition associated with the primary location; and
   specify a size of a reserved partition associated with the reserved location as greater than the size of the primary partition.

9. The apparatus according to claim 1, wherein the instructions are further to cause the processor to:
   determine a size of a primary partition associated with the primary location;
   identify reliability characteristics of a storage medium that includes the primary partition; and
   specify a size of the reserved partition based on the identified reliability characteristics of the storage medium that includes the primary partition.

10. A computer implemented method comprising:
    detecting a system shutdown associated with a computer system that includes a save operation to save data to a primary location;
    determining, as part of the system shutdown, upon completion of the save operation to save the data to the primary location, that an error occurred with respect to the save operation;
    based on a determination that the error occurred with respect to the save operation, identifying a reserved location for saving the data;
    saving the data to the reserved location;
    determining, during start-up of the computer system, whether the data that is to be used for a restore operation associated with the computer system is saved at the primary location or at the reserved location;
    based on a determination that the data is saved at the primary location, accessing the data from the primary location;
    based on a determination that the data is saved at the reserved location, accessing the data from the reserved location; and
    implementing the restore operation based on the accessed data.

11. The method according to claim 10, wherein determining, during the start-up of the computer system, whether the data that is to be used for the restore operation associated with the computer system is saved at the primary location or at the reserved location further comprises:
    analyzing metadata associated with the save operation that includes the saving of the data to the primary location to determine, during the start-up of the computer system, whether the data that is to be used for the restore operation associated with the computer system is saved at the primary location or at the reserved location.

12. The method according to claim 10, wherein
    the data includes non-volatile dual in-line memory module-software (NVDIMM-SW) content,
    the primary location is associated with a primary non-volatile memory express (NVMe) partition that is to be used to save the NVDIMM-SW content, and
    the reserved location is associated with a reserved NVMe partition that is to be used to save the NVDIMM-SW content based on a determination that the error occurred with respect to the save operation.

13. The method according to claim 12, further comprising:
    implementing the primary NVMe partition in a primary peripheral component interconnect express (PCIe) device; and
    implementing the reserved NVMe partition in a reserved PCIe device that is different from the primary PCIe device.

14. A non-transitory computer readable medium having stored thereon machine readable instructions, the machine readable instructions, when executed by a processor, cause the processor to:
    detect a system shutdown associated with a computer system that includes a save operation to save non-volatile dual in-line memory module-software (NVDIMM-SW) content to a primary non-volatile memory express (NVMe) partition;
    determine, as part of the system shutdown, during or upon completion of the save operation that includes saving of the NVDIMM-SW content to the primary NVMe partition, that an error occurred with respect to the save operation;
    based on a determination that the error occurred with respect to the save operation, identify a reserved NVMe partition for saving the NVDIMM-SW content;
    save the NVDIMM-SW content to the reserved NVMe partition; and
    update metadata to indicate usage of the reserved NVMe partition as the primary NVMe partition for the saved NVDIMM-SW content.

15. The non-transitory computer readable medium according to claim 14, wherein the instructions are further to cause the processor to:
    store the updated metadata in an NVMe metadata region of an NVDIMM.

16. The non-transitory computer readable medium according to claim 14, wherein the error includes a peripheral component interconnect (PCI) error on a bus connected to a peripheral component interconnect express (PCIe) device that includes the primary NVMe partition.

17. The non-transitory computer readable medium according to claim 14, wherein the error includes a peripheral component interconnect (PCI) error on a root port to which a peripheral component interconnect express (PCIe) device that includes the primary NVMe partition is connected.

18. The non-transitory computer readable medium according to claim 14, wherein the error includes a performance degradation of a peripheral component interconnect express (PCIe) device that includes the primary NVMe partition.

19. The non-transitory computer readable medium according to claim 14, wherein the error includes an uncorrectable error associated with a peripheral component interconnect express (PCIe) device that includes the primary NVMe partition.

* * * * *